(12) United States Patent
Dolson et al.

(10) Patent No.: US 7,717,597 B2
(45) Date of Patent: May 18, 2010

(54) SEMICONDUCTOR LIGHT ENGINE USING POLYMER LIGHT PIPES AND LIGHTING SYSTEMS CONSTRUCTED WITH THE LIGHT ENGINE

(75) Inventors: Micheal D. Dolson, Corbyville (CA); Ronald O. Woodward, Yorktown, VA (US); James R. McFadden, Oxford, MI (US)

(73) Assignee: Magna International Inc., Aurora (CA)

( * ) Notice: Subject to any disclaimer, the term of this patent is extended or adjusted under 35 U.S.C. 154(b) by 368 days.

(21) Appl. No.: 11/787,303

(22) Filed: Apr. 16, 2007

(65) Prior Publication Data

US 2008/0253144 A1    Oct. 16, 2008

(51) Int. Cl.
    *B60Q 1/00* (2006.01)
(52) U.S. Cl. .................. 362/547; 362/555; 362/545
(58) Field of Classification Search ............... 362/547, 362/551, 582, 554, 555, 580, 362, 373, 294, 362/511, 800, 418, 345
    See application file for complete search history.

(56) References Cited

U.S. PATENT DOCUMENTS 5,327,328 A * 7/1994 Simms et al. ............... 362/26
6,527,411 B1 * 3/2003 Sayers ........................ 362/245
6,991,355 B1 1/2006 Coushaine et al.
7,128,431 B2 * 10/2006 Ludewig et al. ............ 362/26
2004/0202007 A1 * 10/2004 Yagi et al. ................... 362/545
2005/0169006 A1 8/2005 Wang et al.
2007/0070645 A1 * 3/2007 Coushaine et al. ......... 362/555

FOREIGN PATENT DOCUMENTS

WO   WO 2005/025932 A2   3/2005

* cited by examiner

*Primary Examiner*—Sandra L O'Shea
*Assistant Examiner*—Danielle Allen
(74) *Attorney, Agent, or Firm*—Warn Partners, P.C.; Marc Luddy (57) ABSTRACT

A light engine for use in systems such as automotive lighting systems employs two or more semiconductor light sources, such as LEDs. Light emitted from the light sources is captured by light pipes which are mounted such that the light capturing surface of the light pipes are properly positioned, with respect to the semiconductor light sources, substantially independent of changes in the dimensions of the light pipes which may result from thermal expansion or contraction of the light pipes. The light pipes transfer substantially all of the light captured from the semiconductor light sources to light emitting surfaces of the light pipes which can be appropriately located adjacent the output optics of the lighting system. The light engine can be easily assembled as the light pipes are retained in slots on a positioning member which is mounted at a known position with respect to the semiconductor light sources.

28 Claims, 6 Drawing Sheets

SEMICONDUCTOR LIGHT ENGINE USING POLYMER LIGHT PIPES AND LIGHTING SYSTEMS CONSTRUCTED WITH THE LIGHT ENGINE

FIELD OF THE INVENTION

The present invention relates to a light engine employing semiconductor light sources to produce light. More specifically, the present invention relates to a light engine comprising a plurality of semiconductor light sources each of whose emitted light is transferred from the semiconductor source to a respective desired destination via a respective light pipe and to a lighting system constructed with the light engine.

BACKGROUND OF THE INVENTION

With the development of semiconductor light sources, such as light emitting diodes (LEDs), which can output relatively high levels of white light, the development of automotive lighting systems, such as headlamp fixtures, which employ such semiconductor light sources has become possible. However, lighting systems employing semiconductor light sources have proven to be difficult to design and construct as, even with the most advanced semiconductor light sources, multiple sources typically must be employed to obtain the necessary light output levels. Also, unlike prior light sources such as incandescent or gas discharge bulbs which served as single, generally very bright, light sources, semiconductor light sources act as multiple point sources of light and thus the design of the lighting system must differ from conventional designs.

In many of the lighting system designs developed by the assignee of the present invention, a light pipe is employed to capture the light emitted from the semiconductor light source and to transfer that light into the lighting system's optical path which can be a lens, or set of lenses, etc. As the amount of light emitted by the semiconductor light sources is relatively low, the design, manufacture and positioning of these light pipes in the lighting system is important to the effectiveness of the lighting system.

Further, as a lighting system may include many semiconductor light sources and their corresponding light pipes, the cost effective manufacture and assembly of these lighting systems has been challenging. In particular, developing a cost effective system for positioning the light pipes, which system is operable over the wide range of thermal environmental operating conditions which an automotive system must meet, has proven to be difficult.

It is desired to have a lighting system employing semiconductor light sources which is relatively cost effective to manufacture and which provides reasonably robust performance in automotive environments.

SUMMARY OF THE INVENTION

It is an object of the present invention to provide a novel light engine and automotive lighting system employing semiconductor light sources which obviates or mitigates at least one disadvantage of the prior art.

According to a first aspect of the present invention, there is provided a light engine comprising: at least two semiconductor light sources; a heat sink in thermal communication with the at least two semiconductor light sources to remove waste heat therefrom; a positioning member including a set of slots and positioning apertures, the positioning member mounted with respect to the at least two semiconductor light sources such that respective positioning apertures are closely aligned with corresponding light emitting surfaces of the at least two semiconductor light sources; a set of light pipes, corresponding in number to the at least two semiconductor light sources, each light pipe including an optical portion, having a light capturing surface and a light emitting surface, and a non optical portion to mount the light pipe, the non optical portion of each light pipe engaging a corresponding one of the slots in the positioning member such that the light capturing surface of the light pipe is positioned in a respective positioning aperture adjacent the light emitting surface of the semiconductor light source; and a retaining member mounted to the positioning member and including a set of biasing means to bias the light pipes into the slots.

According to another aspect of the present invention, there is provided an automotive lighting system, comprising: a base member; a transparent cover member joined to the base member and forming an optics chamber therebetween; a rear cover joined to the base member and cover member to form a rear chamber adjacent the optics chamber; a mounting bracket and flexible moveably attached to the base member, the mounting bracket having mounted to it a light engine and an optics system, the mounting bracket, flexible gasket and light engine separating the optics chamber from the rear chamber and the light engine comprising: at least two semiconductor light sources, each semiconductor light source having a light emitting surface; a heat sink in thermal communication with the at least two semiconductor light sources to remove waste heat therefrom and to transfer the waste heat to the rear chamber; a positioning member including a set of slots and positioning apertures, the positioning member mounted with respect to the at least two semiconductor light sources such that respective positioning apertures are closely aligned with corresponding light emitting surfaces of the at least two semiconductor light sources; a set of light pipes, corresponding in number to the at least two semiconductor light sources, each light pipe including an optical portion, having a light capturing surface and a light emitting surface, the optics system being located adjacent the light emitting surface of the light pipes, and a non optical portion to mount the light pipe, the non optical portion of each light pipe engaging a corresponding one of the slots in the positioning member such that the light capturing surface of the light pipe is positioned in a respective positioning aperture over the light emitting surface of the semiconductor light source with a selected air gap between the light emitting surface and the light capturing surface; and a retaining member mounted to the positioning member and including a set of biasing means to bias the light pipes into the slots.

The present invention provides a light engine for use in lighting systems such as automotive lighting systems which employ two or more semiconductor light sources, such as LEDs, and a lighting system employing such a light engine. Light emitted from the light sources is captured by light pipes which are mounted such that the light capturing surface of the light pipes are properly positioned, with respect to the semiconductor light sources, substantially independent of changes in the dimensions of the light pipes which may result from thermal expansion or contraction of the light pipes. The light pipes transfer substantially all of the light captured from the semiconductor light sources to light emitting surfaces of the light pipes which can be appropriately located adjacent the output optics of the lighting system. The light engine can be easily assembled as the light pipes are retained in slots on a positioning member which is mounted at a known position with respect to the semiconductor light sources.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
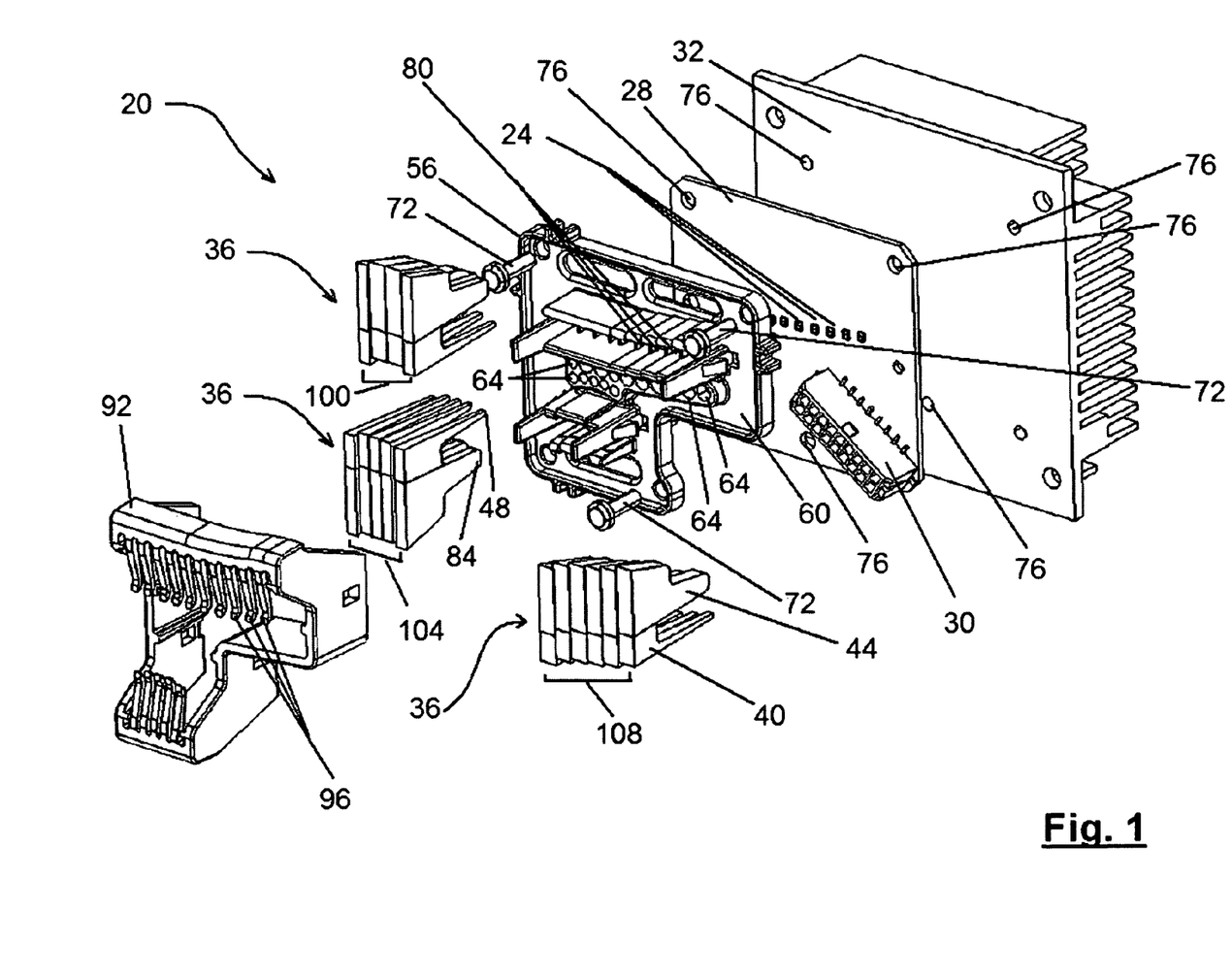
FIG. 1 is an exploded perspective view of a light engine in accordance with the present invention.
Figure 2:
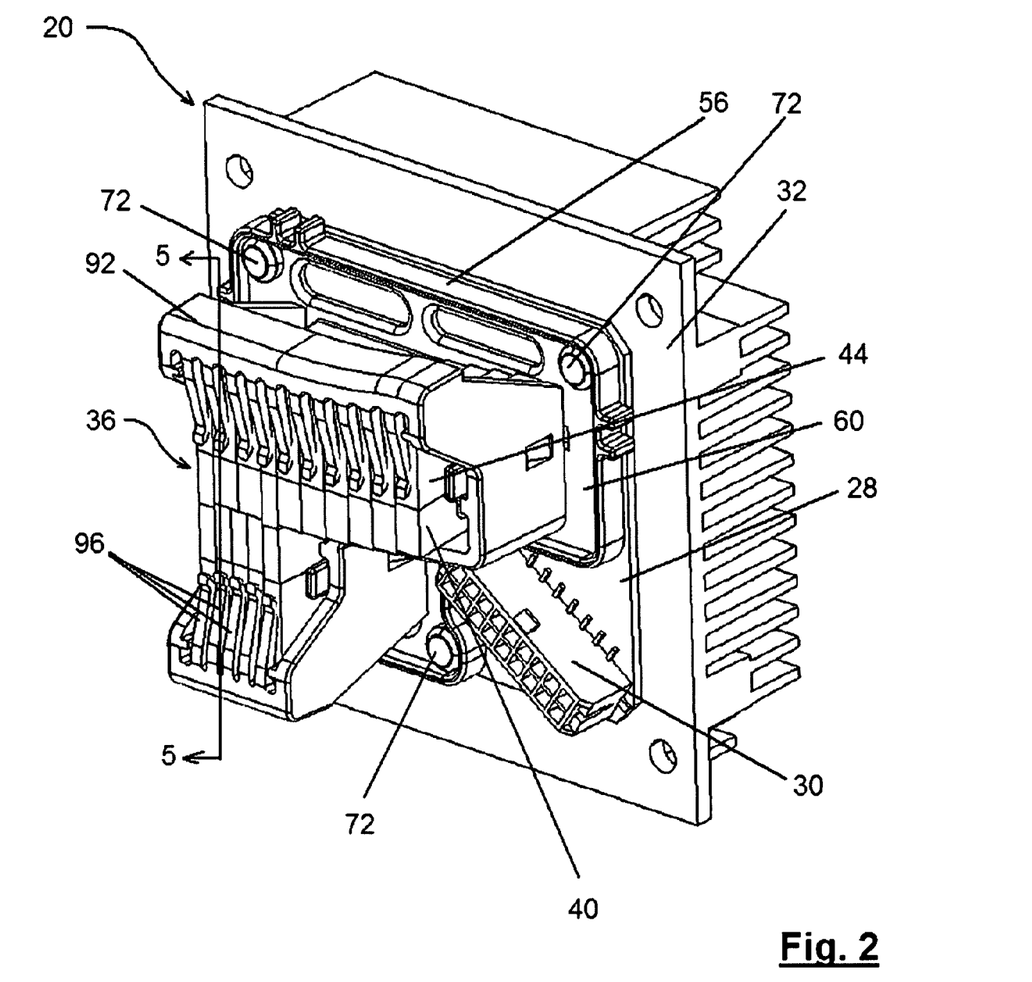
FIG. 2 is a perspective view of the assembled light engine of FIG. 1.

A light engine in accordance with the present invention is indicated generally at 20 in FIGS. 1 and 2. As will be apparent to those of skill in the art, one or more light engines 20 can be combined with an optics system, such as a lens or set of lenses, and an enclosure to form automotive lighting systems, such as headlamps, etc.

Light engine 20 includes a set of semiconductor light sources, which in this embodiment are LEDs 24, which emit the light provided by light engine 20. LEDs 24 are mounted on a substrate 28, which can be an electrical circuit board or other suitable mounting element. Preferably, substrate 28 includes the necessary electrical circuit connectors to supply power to LEDs 24 from an appropriate connector 30 or other power source.

As is known to those of skill in the art, the expected operating lifetime of LEDs is dependent upon the operating temperature of their semiconductor junction and it is thus important that heat be effectively removed from LEDs 24. Accordingly, preferably substrate 28 facilitates, or enhances, the transfer of heat from LEDs 24 to heat sink 32.

Heat sink 32 can be manufactured in any appropriate manner of any suitable material. In the illustrated embodiment, heat sink 32 is an extruded aluminum member which includes a substantially flat surface, to which substrate 28 is attached, and an opposed surface from which a set of upright cooling fins extends. Heat sink 32 can or course assume a variety of other configurations, including configurations with cooling fans, heat wick systems, liquid cooling systems, etc. and the present invention is not limited to any particular configuration of heat sink 32.

Figure 3A:
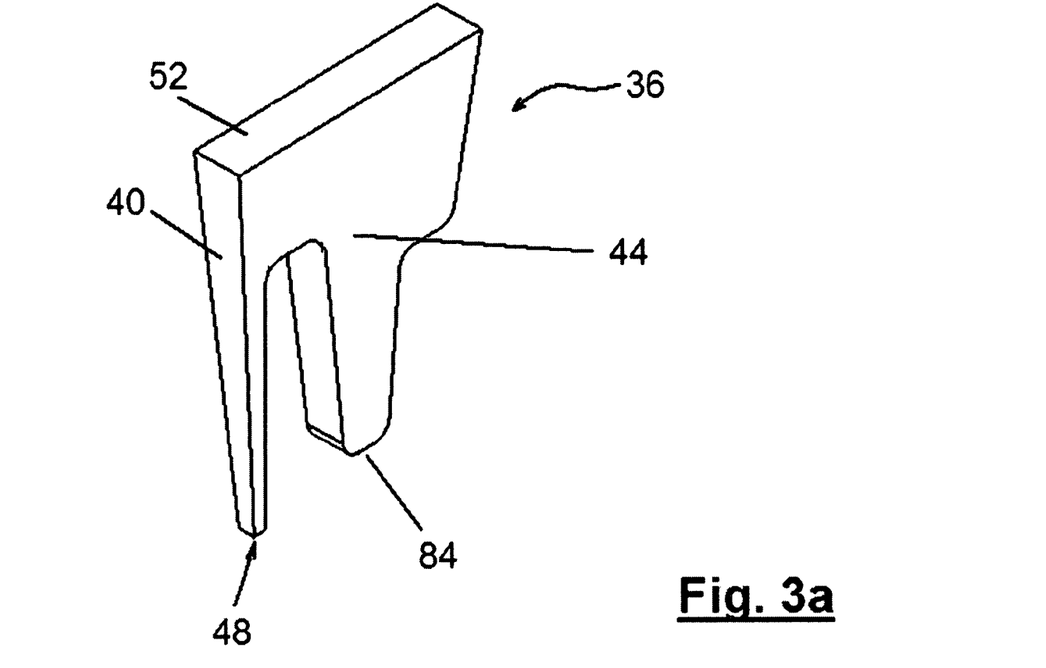
FIGS. 3a and 3b are perspective views showing more detail of a light pipe employed in the light engine of FIG. 1.
Figure 3B:
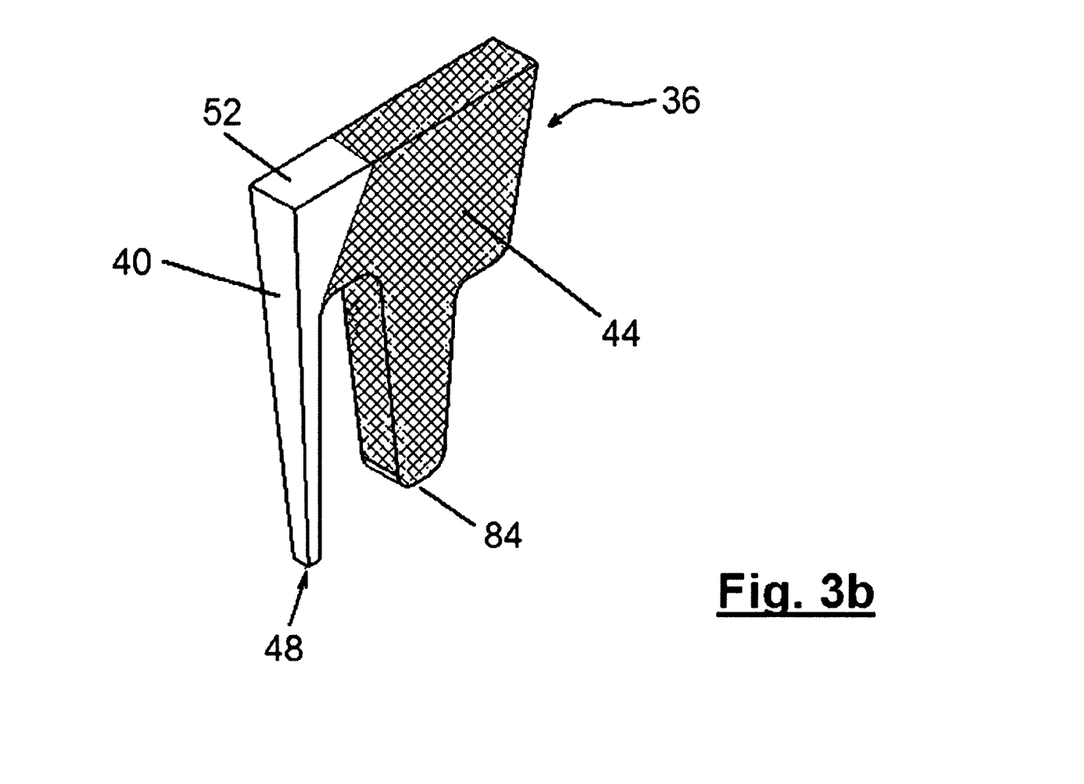

Light engine 20 includes a plurality of light pipes 36, best seen in FIGS. 3a and 3b, each of which includes both an optical portion 40 and a mounting portion 44 (indicated by the hatched lines in FIG. 3b). Optical portion 40 includes a light capture surface 48 and a light emitter surface 52.

In a present embodiment of the invention, light pipes 36 are injection molded from an optically clear polymer, such as Acrymid, manufactured by CYRO Ltd. The mold for light pipes 36 is designed such that optical portion 40 is formed with a smooth, lens-like finish and with as few, and preferably none, optical flaws as possible. Mounting portion 44 need not have the smooth finish of optical portion 40 and molding or other flaws can be accommodated in mounting portion 44.

As is further described below, to efficiently capture as much of the light emitted by LEDs 24 as possible, light capture surface 48 of each respective light pipe 36 must be carefully positioned with respect to the light emitting surface of its corresponding LED 24. One of the necessary positioning factors is the air gap between light capture surface 48 and the light emitting surface of LED 24.

In many applications light pipes 36 will be subjected to a wide range of environmental temperatures. For example, it is expected that automotive lighting systems must survive and operate in temperatures ranging from −45° C. to +85° C. (−50° to +185° F.). Accordingly, light pipes 36 are subject to thermal expansion and contraction which can significantly affect the desired air gap spacing between light capture surface 48 and the light emitting surface of LED 24.

Accordingly, as shown in the Figures, the mounting portion 44 of light pipes 36 provides a body which is parallel to, and of substantially the same length as, the optical portion 40. Mounting portion 44 can thus be engaged to mount a respective light pipe 36, as described below, as any change in the length of optical portion 40 due to thermal conditions will be substantially mimicked by the change in length of the mounting portion 44. Thus, thermal expansion or contraction of the height (the distance between light capture surface 48 and light emitter surface 54) of optical portion 40 is substantially offset by the corresponding thermal expansion or contraction of the height of mounting portion 44 and thus the air gap between the light emitting surface of LEDs 24 and the light capture surface 48 of the light pipes 36 is maintained substantially constant.

Further, while optical portion 40 must be sized, in height and thickness, to appropriately transfer light captured from the respective LED 24 to light emitting surface 52, mounting portion 44 can be thicker and/or more robust to provide a strong body for mounting in light engine 20 and to allow ejection pins or the like to remove light pipe 36 from the mold in which it is fashioned.

A particular configuration of construction of light pipes 36, which is presently preferred for use with some embodiments of the present invention, is disclosed in U.S. Provisional Patent Application Ser. No. 60/819,989, entitled, "Light Pipe With Minimized Thermal Expansion Effects", filed Jul. 11, 2006 and assigned to the assignee of the present invention. The contents of this application are incorporated by reference herein.

Referring again now to FIGS. 1 and 2, light engine 20 further includes a light pipe positioning member 56 which is mounted to substrate 28. Positioning member 56, best seen in FIGS. 1 and 4, includes a substantially planar surface 60 which includes a set of positioning apertures 64, one positioning aperture for each LED 24 on substrate 28 which planar surface 60 covers.

Figure 4:
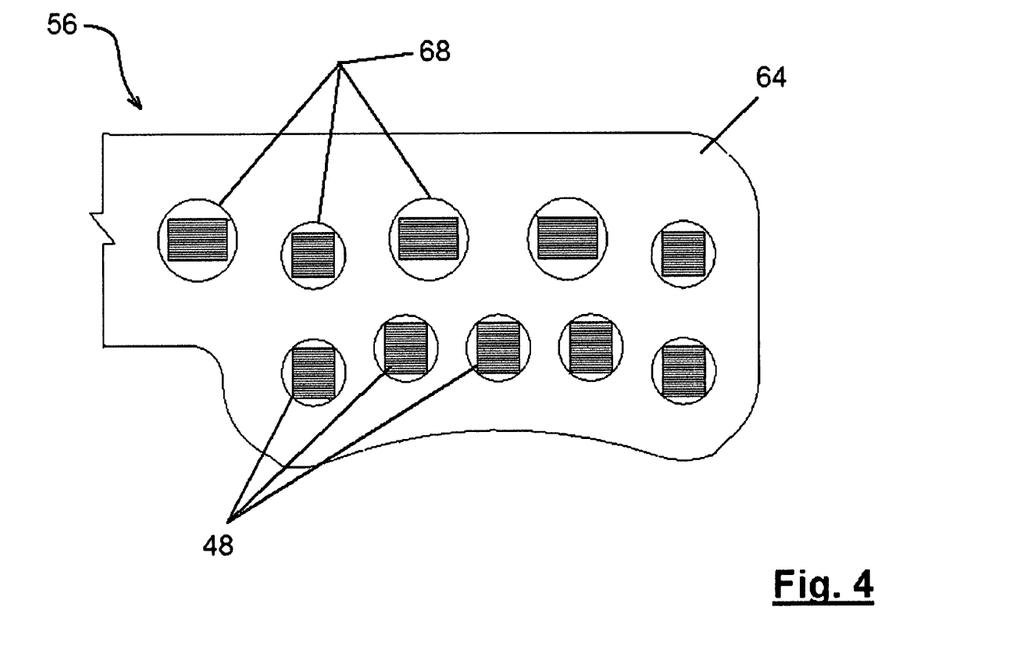
FIG. 4 shows a section through a portion of a positioning member and light pipes of the light engine of FIG. 1.

Positioning apertures 64 are arranged on planar surface 60, and positioning member 56 is positioned on substrate 28, such that each positioning aperture 68 closely encircles the light emitting surface of a respective LED 24. Preferably, positioning member 56 includes a set of index features, such as the illustrated mounting posts 72 or the like, which engage complementary indexing features, such as mounting apertures 76 on substrate 28 and/or heat sink 32 such that positioning member 56 can be easily and fixedly mounted to substrate 28 with apertures 68 correctly aligned with the respective LEDs 24.

Apertures 64 act to correctly position the light capture surface 48 of each respective light pipe 36 about the light emitting surface of a respective LED 24. Apertures 64 are sized such that only the corners of optical portion 40, adjacent light capturing surface 48, contact apertures 64 and thus light emitted from LEDs 24 which enters light capturing surface 48 is not unduly influenced by the contact between apertures 64 and optical portion 40. In this manner, correct positioning of light capture surfaces 48 with respect to the light emitting surfaces of LEDs 24 is assured, despite minor variations in the manufacture and/or assembly of light pipes 36.

Positioning member 56 further includes a set of upstanding slots 80 which extend upward from planar surface 60. Slots 80 are sized to snuggly receive the non optical portion 44 of individual light pipes 36 and to accordingly position the light capture surfaces 48 of the respective light pipes 36 in apertures 64. As the physical dimensions (width, thickness, height) of individual light pipes 36 can vary depending upon their intended use, each slot 80 is correspondingly sized to snuggly hold the respective non optical portion 44.

Figure 5:
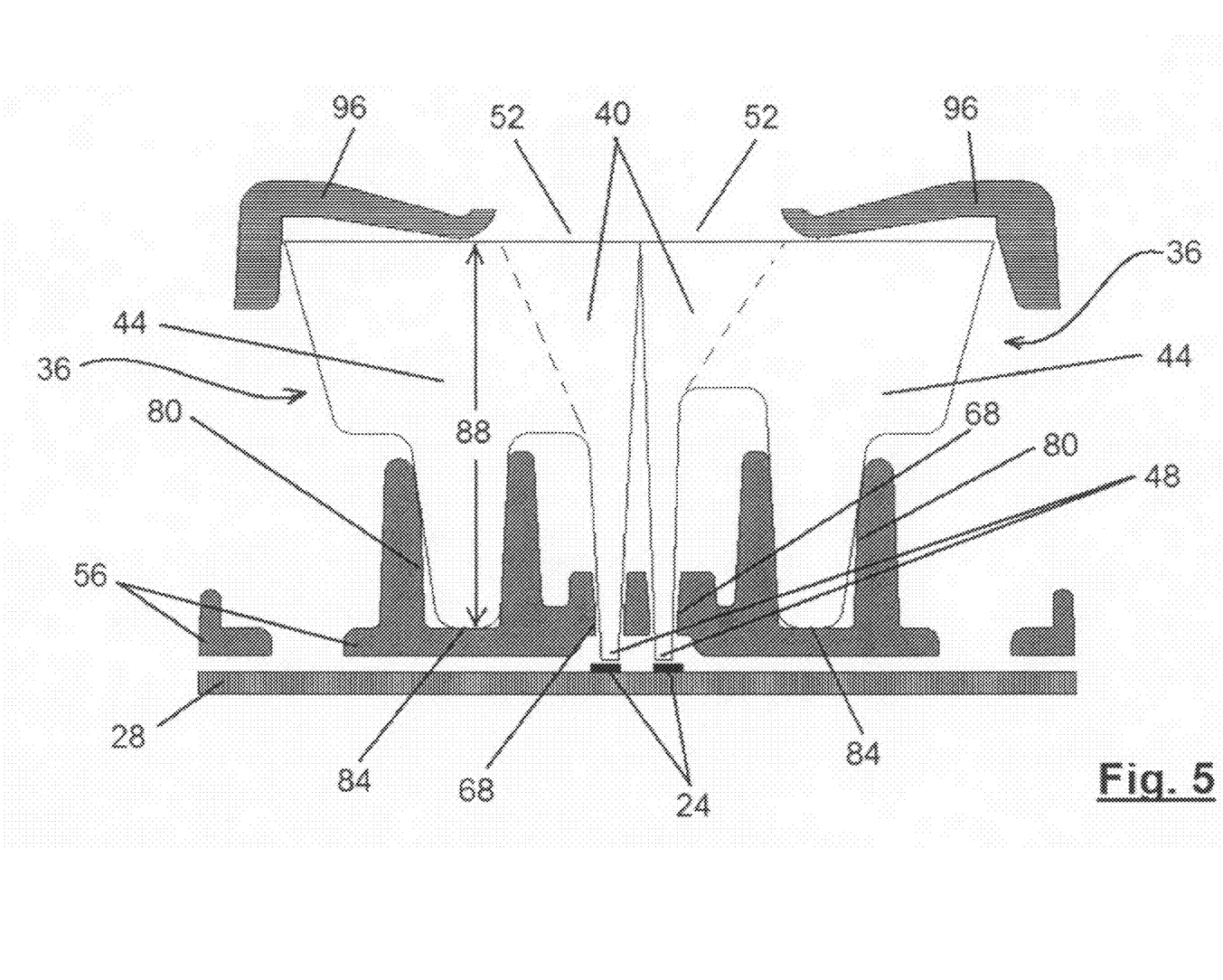
FIG. 5 shows a section taken through line 5-5 of FIG. 2.

As best seen in FIG. 5, when light pipes 36 are inserted into slots 80, the bottom 84 of the non optical portion 44 of each light pipe 36 abuts planar member 56 to position the light capture surface 48 of the respective light pipe 36 at the desired air gap spacing with respect to the light emitting surface of the respective LED 24. As will be apparent to those of skill in the art and as discussed above, any change in the height 88 of a light pipe 36 due to thermal expansion or contraction, will result in substantially corresponding changes in the height of non optical portion 44 and optical portion 40 such that the air gap between the light emitting surface of the LED 24 and the light capturing surface 48 of the light pipe 36 will remain substantially constant.

Once light pipes 36 have been correctly installed in slots 80 in positioning member 56, a retainer member 92 is fastened to positioning member 56, over light pipes 36 and slots 80. As can be seen in the Figures, retainer member 92 includes a set of biasing fingers 96, one biasing finger 96 for each light pipe 36. When retainer member 92 is properly positioned and fastened to positioning member 56, each biasing finger 96 biases a respective light pipe 36 into its respective slot 80 to ensure that the bottom 84 of the non optical portion 44 firmly contacts the bottom of the slot 80.

Biasing fingers 96 are cantilevered from retainer member 92 and are fabricated from a resilient material such that they produce the desired biasing force on light pipes 36 and so that they can also accommodate thermal expansion and contraction of light pipes 36 while maintaining the bottom 84 of the non optical portion in firm contact with the bottom of the slot 80.

As best seen in FIG. 1, light pipes 36 of light engine 20 can be arranged in two or more groups, each of which are positioned by positioning member 56 and retainer member 92 to provide different components of the light beam patterns desired to be produced by the lighting element that light engine 20 is employed in.

For example, group 100 can provide light used in a low beam headlamp pattern, while group 104 can provide light used in a high beam headlamp pattern and group 108 can provide steering light, i.e.—side light which is adaptively supplied or removed according to the steering position of the vehicle to illuminate the road over which the vehicle will pass as it is steered from a straight line. As will be apparent, LEDs 24 providing light through light pipes 36 in groups 100, 104 and 108 can be illuminated or extinguished, as needed for the desired light patterns, either individually or in groups, as desired.

It is also contemplated that additional light pipes 36 can be provided in one or more of groups 100, 104 or 108 to provide for the internationalization of lighting systems produced with light engine 20. For example, light engine 20 can include one or more light pipes 36 which are illuminated when light engine 20 is in a lighting system operated in a country with right hand drive cars and one or more light pipes 36 which are illuminated when light engine 20 is in a lighting system operated in a country with left hand drive cars.

Figure 6:
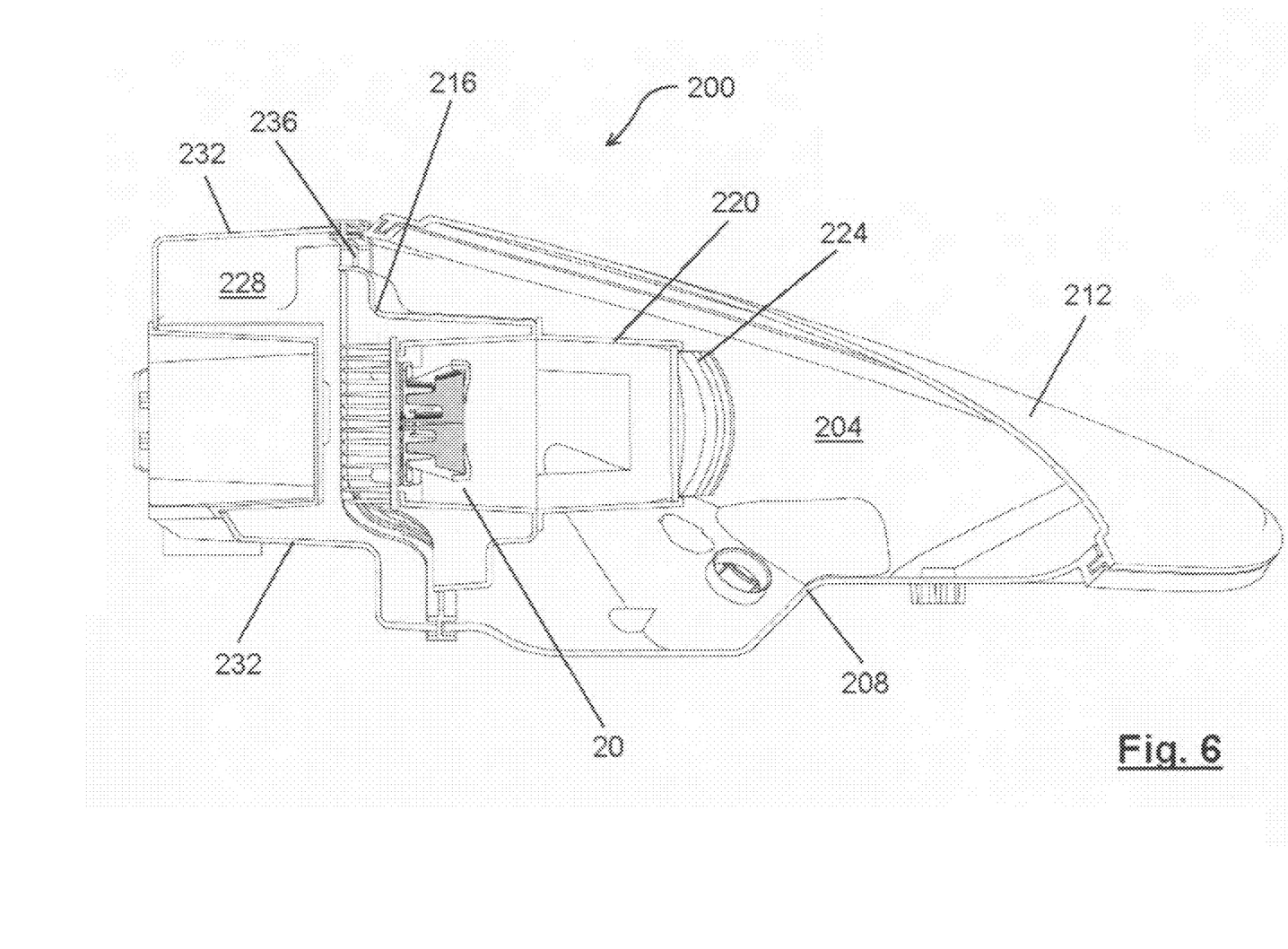
FIG. 6 shows a cross section through a lighting system employing the light engine of FIG. 1.

FIG. 6 shows an automotive lighting system 200, which in the illustrated embodiment is an automotive headlamp, that employs light engine 20. Lighting system 200 is similar to that disclosed in co-pending U.S. patent application Ser. No. 11/729,693, entitled "Headlamp Assembly With Isolated Optics Chamber", filed Mar. 29, 2007 and assigned to the assignee of the present invention and the contents of this application are incorporated by reference herein.

Lighting system 200 includes an optics chamber 204 which is formed from a base member 208 and a transparent cover member 212. Light engine 20 is mounted to a support bracket 216 and an optics support bracket 220 is also attached to support bracket 216 to position an optics system, comprising at least one lens 224, to receive the light emitted from light pipes 36 and to form that light into one or more desired beam patterns.

Optics chamber 204 is sealed and separated from a rear chamber 228, which is formed between a rear cover member 232, that is attached to base member 208 and cover member 212, by support bracket 216 and a flexible gasket 236, which allows support bracket 216 to be positioned to aim lens 224 and light engine 20, relative to base member 208 which is attached to the vehicle.

Heat sink 32 extends into rear chamber 228 and cooling air circulates through rear chamber 228 to remove waste heat from heat sink 32 when lighting system 200 is operating. The cooling air can be driven though rear chamber 228 by one or more electric cooling fans (not shown), or cooling air can be provided in any other suitable means as will occur to those of skill in the art.

As should now be apparent to those of skill in the art, the present invention provides a light engine for use in systems such as automotive lighting systems which employ two or more semiconductor light sources, such as LEDs. Light emitted from the light sources is captured by light pipes which are mounted such that the light capturing surface of the light pipe is properly positioned, with respect to the semiconductor light source, irrespective of changes in the dimensions of the light pipe which may result from thermal expansion or contraction of the light pipe. The light pipes transfer substantially all of the light captured from the semiconductor light sources to their light emitting surfaces which can be appropriately located adjacent the output optics of the lighting system. The light engine can be easily assembled as the light pipes are retained in slots on a positioning member which is mounted at an index position with respect to the semiconductor light sources.

The above-described embodiments of the invention are intended to be examples of the present invention and alterations and modifications may be effected thereto, by those of skill in the art, without departing from the scope of the invention which is defined solely by the claims appended hereto.

We claim:

1. A light engine comprising:
   at least two semiconductor light sources, each semiconductor light source having a light emitting surface;
   a heat sink in thermal communication with the at least two semiconductor light sources to remove waste heat therefrom;
   a positioning member including a set of slots and positioning apertures, the positioning member mounted with respect to the at least two semiconductor light sources such that respective positioning apertures are closely aligned with corresponding light emitting surfaces of the at least two semiconductor light sources;
   a set of light pipes, corresponding in number to the at least two semiconductor light sources, each light pipe including an optical portion, having a light capturing surface and a light emitting surface, and a non optical portion to mount the light pipe, the non optical portion of each light pipe engaging a corresponding one of the slots in the positioning member such that the light capturing surface of the light pipe is positioned in a respective positioning aperture over the light emitting surface of the semiconductor light source with a selected air gap between the light emitting surface and the light capturing surface, wherein said set of light pipes are arranged in a linear manner such that said light emitting surfaces are abutting and continuous with the adjacent light pine; and a retaining member mounted to the positioning member, said retaining member includes a set of biasing means to bias the light pipes into the slots.

2. A light engine according to claim 1 wherein the at least two semiconductor light sources are mounted to a planar substrate which includes electrical circuitry to provide power to the semiconductor light sources, the planar substrate being mounted to and in thermal communication with, the heat sink.

3. A light engine according to claim 1 wherein the heat sink includes a set of cooling fins upstanding from the side of the heat sink opposite the side which is in thermal communication with the semiconductor light sources.

4. A light engine according to claim 1 wherein each light pipe of the set of light pipes is molded from a substantially transparent polymer material and wherein the optical portion of the light pipe and the non optical portion of the light pipe have substantially the same length, such that changes in length of the optical portion of the light pipe due to thermal expansion or contraction corresponds to the changes in the length of the non optical portion such that the selected air gap spacing between the light emitting surface of the semiconductor light source and the light capturing surface of the light pipe remains substantially constant.

5. A light engine according to claim 1 wherein the at least two semiconductor light sources are light emitting diodes.

6. A light engine according to claim 1 wherein the set of biasing means comprises a set of resilient cantilevered fingers, one end of each finger being connected to the retaining member and the other end of each finger being biased against the non optical portion of the respective light pipe.

7. A light engine according to claim 1 wherein the set of light pipes includes at least two light pipes with light emitting surfaces of different dimensions to provide light from the respective semiconductor light sources in different patterns.

8. A light engine according to claim 1 wherein the positioning apertures are shaped to engage only edges of the optical portion of the light pipes.

9. An automotive lighting system, comprising:
a base member;
a transparent cover member joined to the base member and forming an optics chamber therebetween;
a rear cover joined to the base member and cover member to form a rear chamber adjacent the optics chamber;
a mounting bracket that is flexible and moveably attached to the base member, the mounting bracket having mounted to it a light engine and an optics system, the mounting bracket, a flexible gasket separates the optics chamber from the rear chamber and the light engine comprising:
at least two semiconductor light sources, each semiconductor light source having a light emitting surface;
a heat sink in thermal communication with the at least two semiconductor light sources to remove waste heat therefrom and to transfer the waste heat to the rear chamber;
a positioning member including a set of slots and positioning apertures, the positioning member mounted with respect to the at least two semiconductor light sources such that respective positioning apertures are closely aligned with corresponding light emitting surfaces of the at least two semiconductor light sources;
a set of light pipes, corresponding in number to the at least two semiconductor light sources, each light pipe including an optical portion, having a light capturing surface and a light emitting surface, the optics system being located adjacent the light emitting surface of the light pipes, and a non optical portion to mount the light pipe, the non optical portion of each light pipe engaging a corresponding one of the slots in the positioning member such that the light capturing surface of the light pipe is positioned in a respective positioning aperture over the light emitting surface of the semiconductor light source with a selected air gap between the light emitting surface and the light capturing surface, wherein said set of light pipes are arranged in a linear manner such that said light emitting surfaces are abutting and continuous with the adjacent light pipe; and
a retaining member mounted to the positioning member and including a set of biasing means to bias the light pipes into the slots.

10. The automotive lighting system of claim 9 wherein the at least two semiconductor light sources are mounted to a planar substrate which includes electrical circuitry to provide power to the semiconductor light sources, the planar substrate being mounted to and in thermal communication with the heat sink and said heat sink includes a set of cooling fins upstanding from the side of the heat sink opposite the side which is in thermal communication with the at least two semiconductor light sources.

11. The automotive lighting system of claim 9 wherein each light pipe of the set of light pipes is molded from a substantially transparent polymer material and wherein the optical portion of the light pipe and the non optical portion of the light pipe have substantially the same length, such that changes in length of the optical portion of the light pipe due to thermal expansion or contraction corresponds to the changes in the length of the non optical portion such that the selected air gap spacing between the light emitting surface of the semiconductor light source and the light capturing surface of the light pipe remains substantially constant.

12. The automotive lighting system of claim 9 wherein the set of biasing means comprises a set of resilient cantilevered fingers, one end of each finger being connected to the retaining member and the other end of each finger being biased against the non optical portion of the respective light pipe.

13. The automotive lighting system of claim 9 wherein the set of light pipes includes at least two light pipes with light emitting surfaces of different dimensions to provide light from the respective semiconductor light sources in different patterns.

14. The automotive lighting system of claim 9 wherein the positioning apertures are shaped to engage only edges of the optical portion of the light pipes.

15. A light engine comprising:
at least two semiconductor light sources, each semiconductor light source having a light emitting surface;
a heat sink in thermal communication with the at least two semiconductor light sources to remove waste heat therefrom;
a positioning member including a set of slots and positioning apertures, the positioning member mounted with respect to the at least two semiconductor light sources such that respective positioning apertures are closely aligned with corresponding light emitting surfaces of the at least two semiconductor light sources;
a set of light pipes, corresponding in number to the at least two semiconductor light sources, each light pipe including an optical portion, having a light capturing surface and a light emitting surface, and a non optical portion to mount the light pipe, the non optical portion of each light pipe engaging a corresponding one of the slots in the positioning member such that the light capturing surface of the light pipe is positioned in a respective positioning aperture over the light emitting surface of the semiconductor light source with a selected air gap between the light emitting surface and the light capturing surface; and a retaining member mounted to the positioning member, said retaining member includes at least two cantilevered fingers wherein each one of said two cantilevered fingers is configured to apply a biasing force to a respective one of said at least two light pipes into said corresponding one of the slots, said two or more cantilevered fingers being made of a resilient material such that said two or more cantilevered fingers adjust for thermal expansion and contraction to maintain said biasing force.

16. The light engine of claim 15 wherein the at least two semiconductor light sources are mounted to a planar substrate which includes electrical circuitry to provide power to the semiconductor light sources, the planar substrate being mounted to and in thermal communication with the heat sink and said heat sink includes a set of cooling fins upstanding from the side of the heat sink opposite the side which is in thermal communication with the at least two semiconductor light sources.

17. The light engine of claim 15 wherein each light pipe of the set of light pipes is molded from a substantially transparent polymer material and wherein the optical portion of the light pipe and the non optical portion of the light pipe have substantially the same length, such that changes in length of the optical portion of the light pipe due to thermal expansion or contraction corresponds to the changes in the length of the non optical portion such that the selected air gap spacing between the light emitting surface of the semiconductor light source and the light capturing surface of the light pipe remains substantially constant.

18. The light engine of claim 15 wherein the set of biasing means comprises a set of resilient cantilevered fingers, one end of each finger being connected to the retaining member and the other end of each finger being biased against the non optical portion of the respective light pipe.

19. The light engine of claim 15 wherein the set of light pipes includes at least two light pipes with light emitting surfaces of different dimensions to provide light from the respective semiconductor light sources in different patterns.

20. The light engine of claim 15 wherein the positioning apertures are shaped to engage only edges of the optical portion of the light pipes.

21. The light engine of claim 15 wherein said set of light pipes are arranged in a linear manner such that said light emitting surfaces are abutting and continuous with the adjacent light pipe.

22. An automotive lighting system, comprising:
a base member;
a transparent cover member joined to the base member and forming an optics chamber therebetween;
a rear cover joined to the base member and cover member to form a rear chamber adjacent the optics chamber;
a mounting bracket that is flexible and moveably attached to the base member, the mounting bracket having mounted to it a light engine and an optics system, the mounting bracket, flexible gasket and light engine separating the optics chamber from the rear chamber and the light engine comprising:
at least two semiconductor light sources, each semiconductor light source having a light emitting surface;
a heat sink in thermal communication with the at least two semiconductor light sources to remove waste heat therefrom and to transfer the waste heat to the rear chamber;
a positioning member including a set of slots and positioning apertures, the positioning member mounted with respect to the at least two semiconductor light sources such that respective positioning apertures are closely aligned with corresponding light emitting surfaces of the at least two semiconductor light sources;

a set of light pipes, corresponding in number to the at least two semiconductor light sources, each light pipe including an optical portion, having a light capturing surface and a light emitting surface, the optics system being located adjacent the light emitting surface of the light pipes, and a non optical portion to mount the light pipe, the non optical portion of each light pipe engaging a corresponding one of the slots in the positioning member such that the light capturing surface of the light pipe is positioned in a respective positioning aperture over the light emitting surface of the semiconductor light source with a selected air gap between the light emitting surface and the light capturing surface; and a retaining member mounted to the positioning member, said retaining member includes at least two cantilevered fingers wherein each one of said two cantilevered fingers is configured to apply a biasing force to a respective one of said at least two light pipes into said corresponding one of the slots, said two or more cantilevered fingers being made of a resilient material such that said two or more cantilevered fingers adjust for thermal expansion and contraction to maintain said biasing force.

23. The automotive lighting system of claim 22 wherein the at least two semiconductor light sources are mounted to a planar substrate which includes electrical circuitry to provide power to the semiconductor light sources, the planar substrate being mounted to and in thermal communication with the heat sink and said heat sink includes a set of cooling fins upstanding from the side of the heat sink opposite the side which is in thermal communication with the at least two semiconductor light sources.

24. The automotive lighting system of claim 22 wherein each light pipe of the set of light pipes is molded from a substantially transparent polymer material and wherein the optical portion of the light pipe and the non optical portion of the light pipe have substantially the same length, such that changes in length of the optical portion of the light pipe due to thermal expansion or contraction corresponds to the changes in the length of the non optical portion such that the selected air gap spacing between the light emitting surface of the semiconductor light source and the light capturing surface of the light pipe remains substantially constant.

25. The automotive lighting system of claim 22 wherein the set of biasing means comprises a set of resilient cantilevered fingers, one end of each finger being connected to the retaining member and the other end of each finger being biased against the non optical portion of the respective light pipe.

26. The automotive lighting system of claim 22 wherein the set of light pipes includes at least two light pipes with light emitting surfaces of different dimensions to provide light from the respective semiconductor light sources in different patterns.

27. The automotive lighting system of claim 22 wherein the positioning apertures are shaped to engage only edges of the optical portion of the light pipes.

28. The automotive lighting system of claim 22 wherein said set of tight pipes are arranged in a linear manner such that said light emitting surfaces are abutting and continuous with the adjacent light pipe.

* * * * *

UNITED STATES PATENT AND TRADEMARK OFFICE
CERTIFICATE OF CORRECTION

| | | |
|---|---|---|
| PATENT NO. | : 7,717,597 B2 | Page 1 of 1 |
| APPLICATION NO. | : 11/787303 | |
| DATED | : May 18, 2010 | |
| INVENTOR(S) | : Dolson et al. | |

It is certified that error appears in the above-identified patent and that said Letters Patent is hereby corrected as shown below:

Column 6,
Line 67, Claim 1, "pine" should be -- pipe --.

Column 10,
Line 63, Claim 28, "tight" should be -- light --.

Signed and Sealed this

Fourteenth Day of September, 2010

David J. Kappos
*Director of the United States Patent and Trademark Office*